UNITED STATES PATENT OFFICE.

LAURITZ J. DORENFELDT, OF RHEINDUERKHEIM, GERMANY.

PROCESS OF UTILIZING SULFITE LYES.

SPECIFICATION forming part of Letters Patent No. 620,751, dated March 7, 1899.

Application filed October 3, 1898. Serial No. 692,523. (No specimens.)

*To all whom it may concern:*

Be it known that I, LAURITZ J. DORENFELDT, a citizen of the Kingdom of Sweden and Norway, residing at Rheinduerkheim, in the Empire of Germany, have invented certain new and useful Improvements in Processes of Utilizing the Waste Liquors from Sulfite-Wood-Pulp and other Cellulose Mills as Fuel, of which the following is a specification.

Various attempts have been made to utilize the concentrated waste liquors from sulfite-pulp and other mills as a liquid fuel by forcing it through a spray-nozzle into a highly-heated furnace. These experiments, however, were not attended with any successful results, chiefly for the reason that the waste liquor obtained by the vacuum-evaporators was too thick to pass through the fine apertures of the spray-nozzle, while when the liquor was used in a thinner or more easily-flowing condition it was not sufficiently concentrated for the incinerating process through which it had to pass.

From calorimetric tests which were made with waste liquors of the sulfite-pulp mills I found that a concentration of from 40° to 50° Baumé or more as obtained from vacuum-evaporators the number of heat units developed by the concentrated liquor on combustion was so great as to place it in respect to its heating power in the same class of fuel as petroleum residues or as medium brown coal. It was found, however, that with such a concentration the difficulties connected with forcing the concentrated liquor through the spraying apparatus were considerably increased.

The object of this invention is to overcome the difficulties referred to and to utilize the concentrated waste liquors in a very effective and lively manner; and for this purpose the invention consists in a process of utilizing waste liquors from wood-pulp mills by heating the concentrated waste liquors, so as to liquidize the same, and then to subject the same to filtration under pressure, and, lastly, subjecting the thus liquefied and purified liquor in a fine spray to combustion.

In carrying out my process the waste liquors are concentrated as much as possible in a suitable vacuum apparatus or pans until it becomes quite thick. They are then pumped into a heating vessel, in which they are heated indirectly by high-pressure steam. As the temperature of the liquor is thus raised it becomes liquidized and could be used in this condition to pass through fine spray-nozzles into an incinerating-furnace were it not for the fact that in the course of the evaporating process a considerable amount of impurities, partly organic and partly inorganic, are precipitated. The inorganic impurities—such as lime, silica, and iron—have an injurious or deteriorating action and are of such form and size that the fine holes of the spraying apparatus would be quickly choked up. To overcome this difficulty, it is necessary to force the concentrated waste liquor after the same has been rendered sufficiently fluid by heat through a filter-press under high pressure. The filter-press may also be heated a suitable amount, so that the concentrated liquor remains consequently fluid and in a condition of being forced through the spraying-nozzle in the form of fine spray into the combustion-chamber of the furnace. After the waste liquors are thus kept liquid and purified by filtration they are in a condition for being completely burned, so that the combustion be rendered entirely free from obnoxious smell. The products from the combustion, the solids as well as the gases, are utilized, the former for regaining the acid and sulfur and the latter for heating purposes. By the process of filtration to which the concentrated waste liquors are subjected pure chemicals are obtained in the further treatment of the products of combustion, while the entire treatment of the waste liquors is simplified and accomplished at a considerable saving of fuel as compared with the method heretofore used for burning the concentrated liquors of sulfite-wood-pulp and other cellulose mills.

Having thus described my invention, I desire to claim as new and to secure by Letters Patent—

The process herein described of utilizing the concentrated waste liquors of sulfite-wood-pulp and other cellulose mills as fuel, which consists in subjecting the concentrated waste liquors to heat so as to liquidize the same, then subjecting them in heated state to filtration under pressure, and lastly spraying the thus liquefied and purified liquors, whereby they are adapted to be burned as fuel, substantially as set forth.

In testimony that I claim the foregoing as my invention I have signed my name in presence of two subscribing witnesses.

LAURITZ J. DORENFELDT.

Witnesses:
FRANZ STAAB,
HEINRICH VOIGT.